United States Patent Office 3,230,192
Patented Jan. 18, 1966

3,230,192
EXTRUDED PITCH BASED MATERIAL AND
PROCESS FOR PRODUCING THE SAME
Louis Robert Mazurk, Glenview, Ill., assignor to The
Tapecoat Company, Inc., a corporation of Delaware
No Drawing. Filed Dec. 10, 1962, Ser. No. 243,654
11 Claims. (Cl. 60—28.5)

This invention relates to extruded coatings and more particularly relates to a method of preparing extruded coatings, e.g., extruded tapes, containing substantial amounts of pitch.

The corrosion resistant and water proofing properties of coal tar pitch have been recognized in the coatings industry for many years. In view of these properties, coal tar pitch has become a much used coating composition for coating underground pipes and the like and for other applications where corrosion resistance and water proofing are either necessary or desirable. However, because of its brittleness at lower temperatures and its tendency to soften and flow at higher temperatures, coal tar pitch has been somewhat limited with respect to service temperatures. Presently, commercially available pitch based coatings often have service limits to temperatures in the range of about 20 to 160° F. Such limited service temperatures do not permit advantageous application of pitch based coatings for such special uses as coatings on lines at the discharge side of pumping stations, pipe type compressor stationed discharge lines, steam lines and the like, where higher or lower pipe temperatures may render the available pitch based composition undesirable or even useless as pipe coatings.

In addition to the service temperature ranges, such available pitch based coatings often have high penetration characteristics, necessitating the use of very thick coatings in many applications and especially for underground use, unless a shield, e.g., a rock shield composed of coarse impregnated paper and the like, is used to cover and protect the pitch based coating.

It is a general object of this invention to provide, by a new and useful method, pitch based thermoplastic compositions which are capable of use as coatings.

It is another object of this invention to provide a process for making extruded coatings which may be used as coatings over a broad temperature range, and which have low penetration characteristics.

It is still another object of this invention to provide a process for making extruded coatings, which includes subjecting a thermoplastic composition containing a substantial proportion of pitch to a plurality of staged elevated temperatures and extruding the heated composition in a particular temperature range as an extruded tape or other configuration or as a coating extruded directly on a pipe or other object desired to be coated. Another object is to provide such a coating wherein the thermoplastic composition includes, in addition to pitch, plasticized polymer such as polyvinylchloride, polyvinylidenechloride, or copolymer of vinylchloride and vinylacetate.

A still further object of this invention is to provide a process in accordance with the foregoing objects wherein the thermoplastic composition is prepared by mixing liquid plasticized thermoplastic high molecular weight polymer with liquid pitch.

An additional object of this invention is to provide a process for making such coatings in extruded tape form.

Other objects will be apparent to those in the art from the following descriptions:

The process of this invention includes the subjecting of a thermoplastic composition containing a substantial proportion of pitch to a plurality of elevated temperatures as a melt and extruding the resulting heated composition at a temperature in the range of 240 to 260° F. Accordingly, the thermoplastic composition is subjected to a first temperature in a range of about 230 to 270° F., a second temperature in a range of about 305 to 345° F. and a third temperature in the range of about 300 to 340° F. and thereafter extruded at the lower temperature of 240 to 260° F. The thermoplastic composition may be subjected to this plurality of generally ascending temperatures, for example, by passing the composition through a series of temperature zones including a zone maintained at a temperature in the range of 230 to 270° F., preferably about 250° F., a subsequent zone maintained at a temperature in the range of about 305 to 345° F., preferably 325° F., and a third subsequent zone maintained at a temperature in the range of about 300 to 340° F., preferably 320° F., and withdrawing the heated composition from the last zone and extruding at the lower extrusion temperature. The extrusion temperature is believed to be critical in that excess heat during extrusion, e.g., at the die, produces a liquid product which cannot be handled while insufficient temperature at the die causes the extrudate to remain in the extruder, thereby markedly decreasing the output from extrusion, with possible destruction of the material by charring of the melt. The particular temperature within the range of 240 to 260° F. depends to some extent on the speed at which the material moves through the other zones as will be understood by those skilled in the art.

The thermoplastic material melt, after the staged temperature processing, can be extruded as a tape either with or without a backing and can also be extruded on the article to be coated, e.g., a ferrous pipe.

In one embodiment of this invention the thermoplastic composition containing the substantial amount of pitch is prepared by mixing a plasticized polymer, preferably plasticized to a liquid state, into liquid pitch, e.g., in the molten state.

The pitch is used in a substantial amount in the thermoplastic composition, e.g., 30 to 95 parts per 100 and preferably 70 to 90 parts per 100. Any of the available pitches may be used, including coke oven coal tar pitch, blast furnace coal tar pitch, gas producers coal tar pitch, low temperature coal tar pitch, gas works coal tar pitch, and the like. The pitch may more advantageously have a softening point in the range of 80 to 200° F., preferably 100 to 160° F. The pitch is used as a liquid while adding the plasticized polymer thereto and may be considered as molten pitch although there may be added softening agents which decrease the melt temperature. An especially acceptable pitch, for example, is a coal tar pitch having a softening point of about 120° F. and containing creosote oil as a softening agent.

Fillers and softening agents may be included in the pitch in the usual manner for the usual purposes. Thus, almost any inert filler may be included up to about 30 percent concentration, at the expense of pitch. Such fillers include slate flour, mica, calcium silicate, talc, magnesia, carbon black, etc. The softening agent or agents may be any material or materials which plasticizes pitch. Examples of such softening agents are chlorinated biphenyls, enamel flux oil, anthracene oil, creosote oil, and other liquid resins compatible with coal tar pitch.

The polymer or resin and plasticizer are added together to the liquid pitch in the form of a plasticized polymer. Any plasticizers compatible with both the polymer and pitch are useable. However, the phthalate esters are preferred because of their general resistance to microbiological attack. Specifically, di-(2-ethylhexyl) phthalate is a particulraly preferred plasticizer. Other readily available useable plasticizers include generally the polycarboxylic acid ester plasticizers, such as dibutyl phthalate, dimethyl terephthalate, dicyclohexyl phthalate, diphenyl phthalate, and other dialkyl and diaryl phthalates, as well as such plasticizers are tricresyl phosphate, butyl stearate, and the like. The amount of plasticizer used may vary considerably but in the more advantageous applications, the amount is sufficient to completely disperse the polymer and render the plasticized polymer substantially liquid, i.e., flowable. For example, the plasticizer may be used in amounts in a range of 50 to 80 parts per 100 parts of polymer. The preferred amount of plasticizer is 65 to 70 parts per 100 parts of polymer.

The polymers are those normally having monomeric units derived from vinylchloride and/or vinylidenechloride, i.e., —$CH_2$—$CClX$— wherein X is hydrogen or chloride. Readily available polymers which may advantageously be used are polyvinylchloride, polyvinylidenechloride and copolymers of vinylchloride and vinylacetate. Polyvinylchloride is especially preferred. In the polymer or plasticized polymer there may also be included inhibitors, stabilizers, and the like in minor amounts, e.g., about 3 to 5 percent based on polymer, or other small but effective amounts. Such inhibitors and stabilizers are well known in the art.

The following example is offered by way of illustration of the invention and is not intended to be construed as a limitation thereon.

Gas works coal tar pitch having a softening point of about 120° F. is melted and blended with 10 percent creosote as a softening agent and 15 percent carbon black as a filler. The melt is agitated to thoroughly mix the softening agent and filler and the melt temperature is then maintained at about 140° F. A plasticized polymer is prepared by dispersing polyvinylchloride having a molecular weight of about 50,000 in di-(2-ethylhexyl) phthalate plasticizer. The polyvinylchloride and plasticizer are included in the plasticized polymer in a weight ratio of 3:2 and 4 percent stabilizer is added. One part by weight plasticized polymer is then added to the pitch melt for each three parts by weight of total pitch, softening agent and filler. The melt is then agitated and fed into a standard 20:1 Le/D plastic type extruder provided with three heating zones along the barrel. A standard sheeting or tape die is used. The temperature profile of the heating zones is important and is maintained within ±20° F. The first or feed zone is maintained at a temperature of about 250° F., the middle zone at a temperature of about 325° F. and the last zone or zone before the die at a temperature of about 320° F. The die temperature is most important and cannot be permitted to vary more than about 10° F. on either side of 250° F. The die temperature is maintained by cooling water in the jacket normally provided for cooling the die. The tape can be extruded with fusion to a backing material. The extruded tape has a low penetration of about 8 to 12 at 77° F./5 sec./100 g. (Standard ASTM D5–47T method) and is suitable for underground use as a coating without a rock shield such as coarse impregnated paper.

Tapes produced in accordance with the present process are useful in the coating of pipes without the customary fabric carriers to hold the coating in place. The low penetration of the material gives protective qualities to the coating which are equivalent at one-third the thickness to available pitch based coatings. Besides giving added protection with a given thickness, the low penetration permits the use of less material in the coating, i.e., a thinner coating, and also permits savings in freight in shipping either coated pipe or coating material to the place of installation. Thus, these advantages of the coating material produced in accordance with the present process, whether produced as a tape or extruded directly on the object to be coated, may result in other savings besides savings in materials.

It is another advantage of the present process that there may be produced a material that contains a substantial amount of coal tar pitch and which has a wider service temperature range. Adequate service may be obtained with the present coatings at temperatures ranging from about 0° to 275° F. Besides the normal pipe coating, this material, because of its extended service temperature, may be used on special applications, especially where resistance to higher temperatures is desired or required.

The coating material produced in accordance herewith, when used as a protective coating in tape form, has additional advantages in view of its excellent conformability over irregular surfaces such as pipe joints and fittings. Savings in labor costs in installation of the coatings may be realized in the use of the present coating material in tape form.

In general, coating materials produced in accordance with this invention may be considered for advantageous use wherever waterproofing, corrosion resistance, solvent resistance, and/or electrical insulation are required.

All percentages and parts given herein are percentages and parts by weight unless otherwise indicated.

The foregoing detailed description has been given for clearness of understanding only and no unnecessary limitations should be understood therefrom. Some modifications will be obvious to those skilled in the art.

I claim:

1. A process for producing extruded tapes from a thermoplastic mixture comprising a substantial proportion, in the range of 30 to 95 parts, of pitch and a substantial proportion in the range of 5 to 70 parts plasticized high molecular weight polymer selected from the class consisting of polyvinylchloride, polyvinylidenechloride, and the copolymer of vinylchloride and vinylacetate, which process comprises heating said mixture to a temperature in the range of about 300 to 340° F., cooling the mixture to a temperature in the range of 240 to 260° F. and extruding the mixture to tape form.

2. A process for producing extruded material, which process comprises the steps of mixing about 30 to 95 parts by weight of pitch with about 5 to 70 parts by weight of plasticized polymer having monomeric units selected from the group consisting of vinylchloride and vinylidenechloride, heating the resulting mixture to a melt at a temperature about 40 to 100 degrees higher than the extrusion temperature for the composition, and thereafter cooling the resulting heated composition to extrusion temperature and extruding the composition.

3. An extruded material having service temperatures ranging from 0° F. to 275° F. produced by the process of claim 2.

4. The process of claim 2 wherein said polymer has a molecular weight in the range of 20,000 to 60,000.

5. The process of claim 2 wherein said pitch includes a softening agent.

6. The process of claim 2 wherein said pitch is coal tar pitch having a softening point in the range of 100 to 160° F.

7. The process of claim 2 wherein said plasticized polymer is polyvinylchloride and from 65 to 70 parts di-(2-ethylhexyl) phthalate per 100 parts polyvinylchloride.

8. A process for producing extruded tapes which comprises melting coal tar pitch having a softening point of about 120° F., dispersing polyvinylchloride having a molecular weight of about 50,000 in from about 65 to 70 parts by weight di-(2-ethylhexyl) phthalate per 100 parts by weight polyvinylchloride, mixing one part by weight of the resulting liquid plasticized polyvinylchloride with three parts by weight of the molten pitch, delivering the resulting molten mixture to an extruder provided with three heating zones along a barrel, passing said molten mixture through said three zones seriatim while maintaining the first heating zone at a temperature of about 250° F., the second zone at a temperature of about 325° F., the last zone at a temperature of about 320°

F., and cooling and extruding the material from the last zone at a die temperature of about 250° F.

9. An extruded tape having service temperatures ranging from 0° F. to 275° F. and having a penetration no greater than 12 at 77° F./5 sec./100 g. produced by melting coal tar pitch having a softening point of 120° F., dispersing polyvinylchloride having a molecular weight in the range of 20,000 to 60,000 in from about 65 to about 70 parts by weight di-(2-ethylhexyl) phthalate per 100 parts by weight polyvinylchloride, mixing one part by weight of the resulting liquid plasticized polyvinylchloride with three parts by weight of the molten pitch, delivering the resulting molten mixture to an extruder provided with three heating zones along a barrel, passing said molten mixture through said three zones seriatim while maintaining the first heating zone at a temperature of about 250° F., the second zone at a temperature of about 325° F., and the last zone at a temperature of about 320° F., and extruding the material from the last zone at a die temperature of about 250° F.

10. A process for producing extruded material which comprises dispersing from about 20 to 50 parts by weight of a thermoplastic polymer having monomeric units of the structure: —$CH_2CClX$— in which X is selected from the group consisting of chlorine and hydrogen, and having a molecular weight in the range of about 20,000 to 60,000, in about 50 to 80 parts by weight liquid plasticizer for rendering the resulting plasticized polymer liquid, melting pitch having a softening point in the range of 80 to 200° F., mixing from about 5 to about 70 parts by weight of the liquid plasticized polymer with from about 30 to 95 parts by weight of the molten pitch, heating the resulting mixture to a temperature in the range of about 300 to 340° F., cooling the heated mixture and extruding the mixture at a die temperature in the range of 240 to 260° F.

11. An extruded material having service temperatures ranging from 0° F. to 275° F. and having a penetration no greater than 12 at 77° F./5 sec./100 g. produced by the process of claim 10.

References Cited by the Examiner
UNITED STATES PATENTS 3,090,763   5/1963   Hillier _____ 260—28.5

FOREIGN PATENTS 726,816   3/1955   Great Britain.

OTHER REFERENCES

Simonds et al.: Extrusion of Plastics, Rubber and Metals, Reinhold Publishing Corp., New York, Chapt. 4, pages 41 and 42, and Chapt. 5, pages 71 and 72, 1952.

Rose: The Condensed Chemical Dictionary, Reinhold Publishing Corp., New York, page 378, 1961.

MORRIS LIEBMAN, *Primary Examiner.*

LESLIE H. GASTON, *Examiner.*